Dec. 15, 1970    L. A. WHETTER    3,548,212
MULTIBEAM LASER TRACKING SYSTEM
Filed July 17, 1968
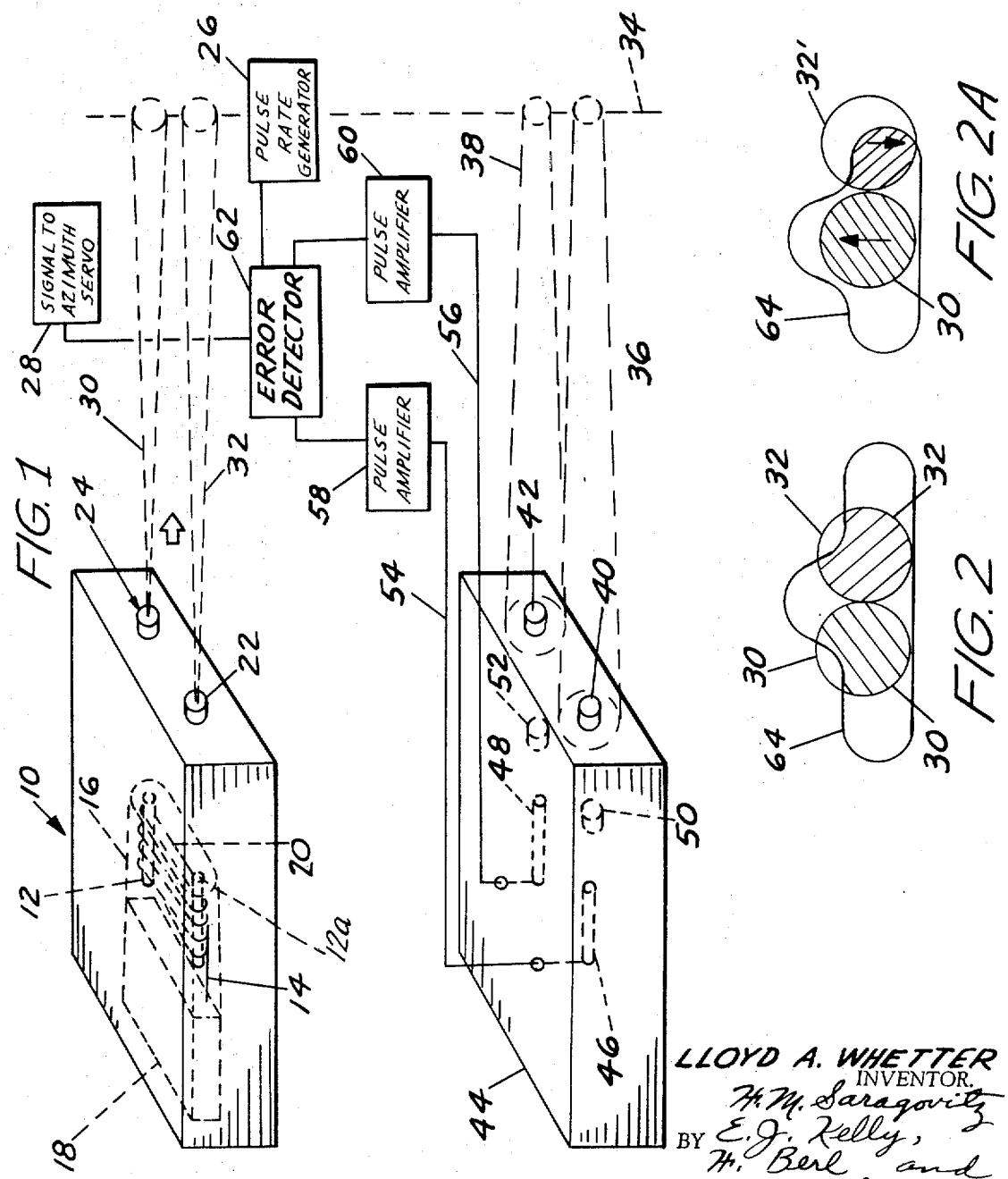

United States Patent Office 3,548,212
Patented Dec. 15, 1970

3,548,212
MULTIBEAM LASER TRACKING SYSTEM
Lloyd A. Whetter, Hazel Park, Mich., assignor, by mesne assignments, to the United States of America as represented by the Secretary of the Army
Filed July 17, 1968, Ser.No. 745,625
Int. Cl. G01j 1/20; H01s 3/00
U.S. Cl. 250—203
1 Claim

ABSTRACT OF THE DISCLOSURE

A multibeam laser lockon system for tracking a moving target utilizing a transmitter emanating two laser beams of different frequencies. A receiver which is responsive to the frequency of the return beams reflected by the target provides control signals for a servomechanism system. The servomechanism drives the transmitter so that the output beam remains on target. When the system is incorporated in a vehicle, the control signals will be input signals to conventional servomechanism and vehicle controls that bring the vehicles main gun into alignment and effectively locks the main gun onto the target.

---

This invention relates to tracking equipment for moving targets. More particularly this invention relates to apparatus which utilizes coherent light energy to track a moving target.

In both military and civilian environments, it is imperative that the presence and relative movement of vehicles and missiles be detected and accounted for. In military situations, a need exists for a device which will track (lockon) enemy targets. More particularly, the stringent performance requirements as presently generated for tank weapon systems encompass increased first round kill capability, increased range of engagement and ability to accurately fire the gun with the vehicle in motion. These requirements created the necessity for an automatic target tracking system.

Radar systems which have been developed to accomplish this general purpose are well known in the art. These prior art radar systems have met with limited success because of the inability to accurately detect small targets or discriminate between many targets which are in close proximity. The relatively low frequency (UHF) radar wave results in a relatively divergent beam and is thus unable to "pick out" small targets. In contrast, a beam of coherent light transmitted by a Laser (light amplification by stimulated emission of radiation) can be focused to a very narrow beam. The use of laser beamed energy in a tracking system results in vastly improved discrimination over conventional radar systems using ultrahigh frequency radio waves.

One approach towards the implementation of laser beamed energy in a tracking device is disclosed in applicant's copending U.S. patent application, Ser. No. 667,-330, filed Sept. 8, 1967. That application employs a single laser transmitting beam of one discreet frequency and a receiving device which is divided into a series of distribution planes to receive target reflected energy. The performance of a single beam laser system requires very close amplitude measurement of target energy. This energy is proportional to range and the effects of environmental change requires periodic calibration.

According to the present invention, there is provided a target tracking system employing at least two laser transmitting beams and a receiver having two detectors to detect the reflected energy. The laser beams are each of a different frequency. The receiver requires receipt of only a detectable energy level for each reflected beam since the detectors are frequency responsive and hence senses only frequency content of the beams. There is no specific requirement on the return energy level, therefore, the laser lockon device can be used on any type target without recalibrating for varying environmental conditions. Output signals from the detectors are amplified and compared whereby an error signal is produced to drive a servo system which keeps the laser beams and guns locked onto the target.

The general object of the invention therefore is to provide apparatus for use in tracking a moving target.

Another object of the present invention is to utilize laser technology as a means for automatically tracking a target.

Still another object of the present invention is to provide a tracking apparatus utilizing beams of coherent light which are of different frequencies.

Yet another object of the present invention is to provide an aiming reference for the main gun of a tank and provide tracking accuracy for the weapon.

A still further object of the present invention is to provide receiver apparatus for a laser beam tracking system which utilizes energy conversion devices responsive to different frequencies.

A still further object of the present invention is to provide a system for detecting and tracking targets which is difficult to locate by countermeasure techniques.

Other objects and advantages of the present invention will become apparent to those of ordinary skill in the art by the following description when considered in relation to the accompanying drawing of which:

FIG. 1 is a perspective view of the transmitter and receiver according to the invention.

FIGS. 2 and 2A are views of the laser beams in relation to the target.

Referring now to the drawing, the transmitter means is shown generally at 10 comprising first and second laser rods 12 and 12a, optics 16, and pumping equipment 18. As explained in the inventor's above referenced patent application, in conjunction with pumping equipment 18, a flash tube 20 containing xenon or other suitable gas is utilized to raise the energy level of certain atoms within the laser material 12 and 12a. Conventional reflecting end plates are located on the ends of resonant cavity 16 within which the conventional photo reverberations are set up to provide a cascade of photons at a wavelength dependent upon the laser cyrstal chosen. A trigger electrode 14 is provided to dump the energy from a pulse network contained within pumping equipment section 18. A laser repetition rate of 10 pulses per second is a suitable repetition rate to preclude target escape in the time frame required for successive coincident pulses.

The laser beam generating devices 12 and 12a are crystal rods of different material to enable each to operate at a different spectral wavelength. Exemplary of suitable materials which could be utilized in the respective generating devices are ruby and neodymium glass crystal which operates at wavelengths of 0.6943 and 1.06 microns respectively. Both of these crystal rods may be energized by a single flashtube 20. If desired, however, individual flashtubes may be utilized. When the crystals are irridiated by light from the flashlamp, most of the energy is dissipated as heat, however, a portion of its is emitted in the form of red and green radiation. Assuming for example that laser rod 12 is formed of ruby material consisting of aluminum trioxide doped with trivalent chromium. The red and green radiation is absorbed by the ruby. This energy provides the excitation to pump the chromium atoms to higher energy levels. The ruby funnels the energy which it absorbs over a broad spectral region into a narrow emission line of the trivalent chromium ion around 6943 angstroms. The radiation emerges coherently through the partially reflecting end of the ruby. A similar analysis is applicable to the neodymium crystal.

The pulse duration of a crystal laser 16 is approximately one millisecond in duration. In tracking systems of the type employed here, however, short, high energy pulses are required. To accomplish this Q-spoiling or "switching" techniques may be employed to permit the buildup of every powerful laser pulses. Two generally well known Q-spoiling techniques utilized to generate these narrow pulses have been the Kerr-cell technique and a mechanical approach utilizing a rotating mirror at one end of the crystal. Basically, in the Q-spoiling or Q-switching technique, very high energy is stored in the metastable state by artificial means so that when the reflectivity is turned on, resonance is established and stimulated emission occurs. The two laser cavities may also be Q-switched by a common rotating prism or by two prisms rotating on a common motor shaft at approximately 24,000 r.p.m. To insure proper operation, the flashlamp output must be synchronized with the Q-switch. This timing information can be taken from the rotating prism by a variable angle photodiode and light source.

It may also be desirable that one laser rod be flashed later than the other. To accomplish this, two timing pulses will be obtained from the optical synchronization pick off for triggering two pulse networks at different times. One timing pulse controls a thyratron switching circuit which immediately triggers the power supply and dumps one pulse network. The second timing pulse would be delayed and then sent to a second power supply trigger circuit. As in the first trigger circuit, the second trigger circuit is a thyratron switching circuit which would command the power supply to dump a charged pulse network. By suitable adjustment of a delay circuit, the trailing edge of the two flashlamp outputs can be made to coincide in time. After a time interval, both systems would be simultaneously Q-switched by a common network.

The output beams 30 and 32 of lasers 12 and 12a will be transmitted through optics 24 and 22, respectively, which serve to collimate the beams into very narrow beamwidths. The transmitter and receiver optics may be aligned and directed by information received from the range gate 26 and servocomponents 28. They receive the range and azimuth information initially from an external acquisition system, not shown.

Filters 50 and 52 will filter the extraneous noise and background clutter. Interference caused by clutter can be partially reduced by using a range gate 26 so that only information at the desired range will be accepted by the receiver. Synchronization as also required to correlate the range gate to the initial transmitter pulses.

Energy passing through filter network 50 and 52 will be converted to electrical signals by conversion means, known as detectors 46 and 48. If ruby and neodymium glass crystals are used in the transmitter, suitable detectors for wavelengths of 1.06 and 0.6943 microns respectively are RCA7102 and 7265 photo multipliers. Photomulipliers rather than photodiodes are utilized to reduce the preamplifier noise requirements. These detectors will have a very narrow band pass and the return beam energy received by one detector of one transmitted frequency will not interfere with the return beam energy of the other frequency.

The output of detectors 46 and 48 provide the inputs to the servo system 28 of the vehicle. These signals are integrated on error detector 62 after being amplified in amplifiers 58 and 60. The particular pulse amplifiers that deliver voltage pulses to error detector 62 are well within the state of the art and need not be explained here. The amplifiers 58 and 60 will have a frequency response of two megacycles and will incorporate small mesa transistors. Error detector 62 will provide as an output a plus or minus corrective signal which will be utilized as an input to servo system 28. An example of a suitable error detector would be a transformer summing the differential mix of the outputs of the two pulse amplifiers 58 and 60.

Referring now to FIGS. 2 and 2A, the acquired target is shown at 64 with both output beams 30 and 32 centered thereon. The cross-hatched portion indicates that portion of each beam which the target intercepts. Reference numerals 30' and 32' represent that portion of the output beams which bypass the target. In FIG. 2A, the amount of output beam 32' which misses the target is much larger than that in FIG. 2, hence, a lesser amount of energy will be reflected in the return beam 36. Hence, the signal output of detector 46 will be reduced accordingly. On the other hand, all of output beam 30 is reflected by the target in FIG. 2A and hence the energy received by detector 48 will be increased over that received when the target was located as shown in FIG. 2.

Output beams 30 and 32 are directed to the target indicated by plane 34 and reflected as return beams 36 and 38. The return beams are intercepted by the receiver means indicated generally at 44. Similar to transmitter optics 22 and 24, Cassegrainean optics, 40 and 42 or modifications thereof, are provided on the receiver means to refocus the return energy. The received signal is directed to the individual frequency responsive detectors 46 and 48, through narrow-band spectral filters 50 and 52.

In operation, the two laser rods 12 and 14 are pulsed in the transmitter to emit output laser beams 30 and 32, each of a different frequency. The beams are transmitted at a previously optically sighted target. When the beams ars equally centered on the target as shown in FIG. 2, the amount of energy received by receiver 44 in detector 46 is equal to the energy received in detector 48. The electrical signals detected in error detector 62 are equal and opposite and no signal is sent to servosystem 28. Once the target is attained, range gate 26 is set up which electronically samples returns within that range gate only. This eliminates the false returns from near and far objects in the target area.

If, however, the target moves so that laser output beams 30 and 32 are not centered on the target as shown in FIG. 2A, then the energy of return beam 38 increases while that of return beam 36 decreases. Accordingly, the electrical signal from detector 48 increases while that from detector 46 decreases. Both of these signals are amplified in respective amplifiers 60 and 58 and compared at error detector 62. An error signal dependent upon the strength of the detector signals is sent to servomechanism system 28 which drives the transmitter to the left so that the output beam remains on target. The armament system may also be slaved to the system so that the vehicle weapons remain on target. It should be noted that one of the systems according to the invention results in a push-pull mode of operation in contrast to a linear mode. This results in an error signal which is twice that of a linear system. The push-pull mode results when the energy which is intercepted by a moving target at one wavelength is increasing while that on the other is decreasing. The error signal is assumed to be the difference signal generated by the two wavelengths and, therefore, the push-pull mode error information rate or gain is twice that of the linear system.

It should be observed that the best tracking capability is achieved when the projected beams at the target are tangent, centered on target and when the width of the exposed target surface is twice the width of the beam at the target.

It should further be observed that there is no specific requirement on the return energy level, therefore, the laser tracking system according to the present invention can be used on any type of target without recalibrating for varying environmental conditions.

It should further be noted that gallium arsenide diodes or gas lasers may be used for transmitting sources.

Since it is obvious that many changes and modifications can be made in the above described details without departing from the nature and spirit of the invention, it is to be understood that the invention is not limited to said details except as set forth in the appended claim.

What I claim is:

1. Apparatus for use in a multibeam tracking system for tracking a moving target comprising:

transmitter means for transmitting a first output beam of coherent light at a first frequency and a second output beam of coherent light at a second frequency to be reflected by said target as first and second return beams of coherent light respectively, receiver means for receiving said return beams including a first frequency responsive conversion means responsive to the frequency of said first output beam and a second frequency responsive means responsive to the frequency of said second output beam for converting said return beams to first and second electrical signals for controlling the direction of said output beams, first amplifier means connected to said first conversion means for amplifying said first electrical signal, second amplifier means connected to said second conversion means for amplifying said second electrical signal, error detector means connected with said first and second amplifier means and responsive to said first and second signals to produce an error signal, and servomechanism means responsive to said error signal to turn said transmitting means so that said first and second beams remain directed at said target.

References Cited

UNITED STATES PATENTS 3,437,820   4/1969   Thompson et al. ____ 250—214X

OTHER REFERENCES

Digital Laser Ranging and Tracking Using a Compound Axis Servomechanism, T. W. Barnard and C. R. Fencil, Applied Optics, April 1966, vol. 5, No. 4, pp. 497–505.

JAMES W. LAWRENCE, Primary Examiner

E. R. LAROCHE, Assistant Examiner

U.S. Cl. XR.
250—217, 226; 331—94.5